US010442721B1

(12) United States Patent
Tucker et al.

(10) Patent No.: US 10,442,721 B1
(45) Date of Patent: Oct. 15, 2019

(54) MICROGRAVITY-BASED METHOD AND SYSTEM FOR FABRICATING OPTICAL FIBERS

(71) Applicants: Dennis S. Tucker, Huntsville, AL (US); Jeremy A. Tucker, Antioch, TN (US)

(72) Inventors: Dennis S. Tucker, Huntsville, AL (US); Jeremy A. Tucker, Antioch, TN (US)

(*) Notice: Subject to any disclaimer, the term of this patent is extended or adjusted under 35 U.S.C. 154(b) by 0 days.

(21) Appl. No.: 16/384,118

(22) Filed: Apr. 15, 2019

(51) Int. Cl.
*C03B 37/025* (2006.01)
*C03B 37/10* (2006.01)
*C03C 13/02* (2006.01)
*C03C 13/04* (2006.01)
*C03B 37/012* (2006.01)
*C03C 25/106* (2018.01)
*C03C 25/005* (2018.01)

(52) U.S. Cl.
CPC ...... *C03B 37/01265* (2013.01); *C03B 37/025* (2013.01); *C03C 25/005* (2013.01); *C03C 25/106* (2013.01); *C03B 2201/82* (2013.01); *C03B 2201/86* (2013.01)

(58) Field of Classification Search
CPC .......... C03C 13/00; C03C 13/041–044; C03B 37/01202; C03B 37/02; C03B 37/025; C03B 2201/80; C03B 2201/82; C03B 2201/83; C03B 2201/86; C03B 2201/88
See application file for complete search history.

(56) References Cited

U.S. PATENT DOCUMENTS

| | | | | | |
|---|---|---|---|---|---|
| 4,565,557 | A | * | 1/1986 | Naumann | B06B 3/00 65/425 |
| 4,654,065 | A | * | 3/1987 | Naumann | C03B 37/01205 65/477 |
| 6,484,539 | B1 | * | 11/2002 | Nordine | C03B 37/02 428/364 |
| 7,848,606 | B1 | * | 12/2010 | LaPointe | C03B 32/00 385/123 |
| 9,533,915 | B2 | | 1/2017 | Johnson et al. | |
| 2015/0104138 | A1 | * | 4/2015 | Johnson | C03B 37/15 385/123 |
| 2015/0266767 | A1 | * | 9/2015 | Glover | C03B 37/0253 385/142 |

(Continued)

*Primary Examiner* — Jason L Lazorcik
(74) *Attorney, Agent, or Firm* — Peter J. Van Bergen

(57) ABSTRACT

In a unit gravity environment, a glass preform is encased in a material to generate an encased glass preform. The material remains solid at the glass preform's crystal melting temperature and is inert with respect to the glass preform. The encased glass preform is placed in a microgravity environment and heated to a temperature above the crystal melting temperature until the glass preform melts and is free of crystals, wherein a crystallite-free glass preform is encased within the material. The crystallite-free glass preform is then cooled in the microgravity environment to generate a solid crystallite-free glass preform encased within the material. While still in the microgravity environment, the material encasing the solid crystallite-free glass preform is removed in the microgravity environment and the solid crystallite-free glass preform is polished. A glass optical fiber is then drawn from the solid crystallite-free glass preform in the microgravity environment.

24 Claims, 2 Drawing Sheets

(56) References Cited

U.S. PATENT DOCUMENTS

2017/0233282 A1* 8/2017 Volfson .................. C03C 25/12
　　　　　　　　　　　　　　　　　　　　　　385/128
2019/0031552 A1* 1/2019 Clawson ............. C03B 37/0216
2019/0152835 A1* 5/2019 Volfson ............... C03B 37/0253

* cited by examiner

MICROGRAVITY-BASED METHOD AND SYSTEM FOR FABRICATING OPTICAL FIBERS

STATEMENT OF GOVERNMENT INTEREST

The invention described herein was made in part by an employee of the United States Government and may be manufactured and used by or for the Government of the United States of America for governmental purposes without the payment of any royalties thereon or therefor.

FIELD OF THE INVENTION

The invention relates generally to optical fiber fabrication, and more particularly to a method and system for fabricating optical fibers in a microgravity environment.

BACKGROUND OF THE INVENTION

Glass optical fibers are used extensively in lasers and communications applications. Ideally, glass optical fibers are free of crystals along long lengths of the fibers. Unfortunately, some non-oxide glasses (e.g., chalcogenides, heavy metal fluoride glasses such as zirconium fluoride-barium fluoride-lanthanum fluoride-aluminum fluoride-sodium fluoride known as "ZBLAN") are subject to crystal formation when produced in unit-gravity (i.e., Earth-based) facilities. While some research has shown that non-oxide glasses have reduced crystal formation when processed in microgravity environments (e.g., space), proposed methods and systems for non-oxide glass optical fiber production have only yielded short lengths of fibers on the order of a meter or two.

SUMMARY OF THE INVENTION

Accordingly, it is an object of the present invention to provide a method of producing crystal-free optical fibers.

Another object of the present invention is to provide a method of producing long-length optical fibers from non-oxide glass preforms.

Other objects and advantages of the present invention will become more obvious hereinafter in the specification and drawings.

In accordance with the present invention, a method is provided for fabricating a glass optical fiber from a glass preform having a crystal melting temperature. In a unit gravity environment, the glass preform is encased in a material to generate an encased glass preform, wherein the material remains solid at the crystal melting temperature and is inert with respect to the glass preform. The encased glass preform is placed in a microgravity environment. The encased glass preform is then heated in the microgravity environment to a temperature above the crystal melting temperature until the glass preform melts and is free of crystals, wherein a crystallite-free glass preform is encased within the material. The crystallite-free glass preform is then cooled in the microgravity environment to generate a solid crystallite-free glass preform encased within the material. The material encasing the solid crystallite-free glass preform is then removed in the microgravity environment. The solid crystallite-free glass preform is polished in the microgravity environment. A glass optical fiber is then drawn from the solid crystallite-free glass preform in the microgravity environment.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
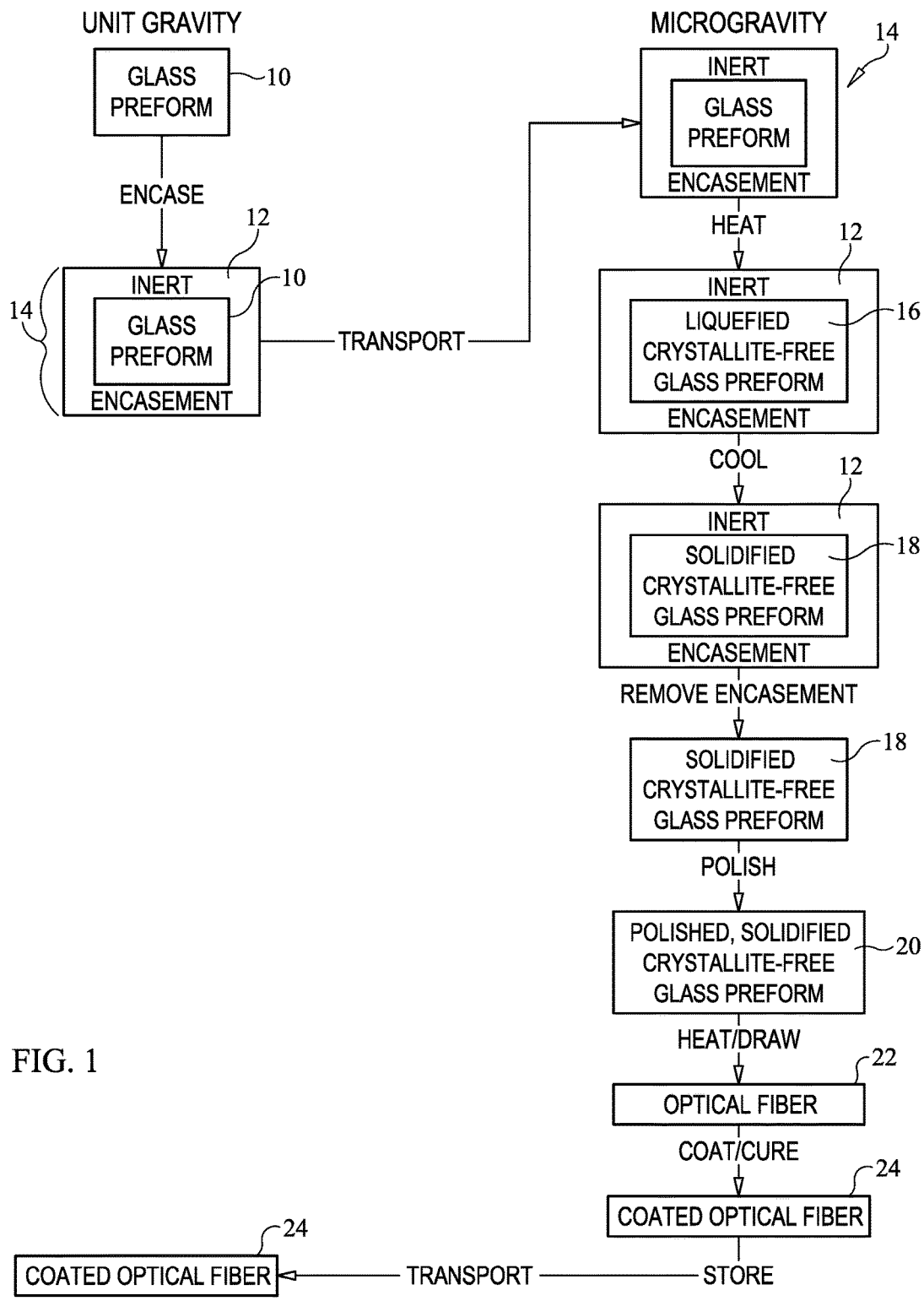
FIG. 1 is a schematic view of a method for producing optical fibers in a microgravity environment in accordance with an embodiment of the present invention.

Referring now to the drawings and more particularly to FIG. 1, a schematic view is shown of a method for producing optical fibers in accordance with an embodiment of the present invention. The produced optical fibers can be made from oxide or non-oxide glasses. As will be explained further below, the present invention is particularly useful for producing long-length optical fibers (e.g., on the order of one kilometer) made from non-oxide glasses to include heavy metal fluoride glasses (e.g., ZBLAN) and chalcogenide glasses.

The method of the present invention takes place partly in a unit gravity environment (e.g., an Earth-based location) and partly in a microgravity environment (e.g., in very low gravity environments such as space). While microgravity environments can be created for very brief periods time of five minutes or less (e.g., parabolic flights, suborbital flights, drop towers, etc.), the term "microgravity" as used herein assumes a space-based environment found on orbiting vehicles.

The sequential processing steps of the present invention are set forth in two columns in FIG. 1. The first column entitled "UNIT GRAVITY" specifies the elements and processing steps occurring in a unit gravity environment (e.g., on Earth), while the second column entitled "MICROGRAVITY" specifies the elements and processing steps occurring in a microgravity environment (e.g., while orbiting in space). At the outset, a glass preform 10 is completely encased (while in a unit gravity environment) by an inert encasement material 12 to produce an encased glass preform 14. The thickness of encasement material 12 can range from approximately 100 nanometers to approximately 5 microns.

By way of an illustrative example, it will be assumed that glass preform 10 is a non-oxide glass. Inert encasement material 12 must be inert with respect to the material used for glass preform 10 in both the solid and heated/melted phases of preform 10, while also remaining solid when preform 10 is heated/melted. For non-oxide glasses, encasement material 12 can be platinum, gold, or alloys of platinum and gold.

Current unit-gravity fabrication of optical fibers from non-oxide glass utilizes preforms that are cylinders limited to 10-12 millimeters in diameter and 10 centimeters in length in order to reduce crystal formation during processing. However, preforms processed in accordance with the present invention are not limited in size owing to their reprocessing in a microgravity environment as will be explained further below.

Encased glass preform 14 is transported, or otherwise placed, in a microgravity environment. Once in the microgravity environment, encased glass preform 14 is heated so that glass preform 10 is raised to the crystal melting temperature associated therewith. As is known in the art, a material's crystal melting temperature is the temperature at which the material melts and all crystals therein are eliminated. Accordingly, the particular crystal melting temperature will be different depending on the glass selected for glass preform 10. As a result of such heat processing, encasement material 12 encapsulates and contains a liquefied and crystallite-free glass preform 16.

Liquefied preform 16 within encasement material 12 is next cooled such that a solidified and crystallite-free glass preform 18 is generated within encasement material 12. More specifically, the cooling process initially reduces the temperature of the encased preform to its glass transition temperature at a rate that will preclude crystal formation. The preform is then held at the glass transition temperature for a period of time to allow thermal stresses to anneal. Finally, the cooling process allows the preform to cool to room temperature (e.g., typically 20-22° C.) yielding solidified and crystallite-free glass preform 18. Specific temperatures and times for the cooling process are material dependent and are understood in the art.

The next step in the optical fiber production in the microgravity environment involves removing encasement material 12 from crystallite-free glass preform 18. The encasement removal process can be a chemical-based process (e.g., use of aqua regia to dissolve encasement material 12), or a mechanical-based process (e.g., grinding, sand blasting, etc.) without departing from the scope of the present invention.

The exposed surfaces of the now unencased and crystallite-free glass preform 18 presents surface regions that are subject to crystal formation during a fiber drawing process. The surface imperfections can be the source of weakness and/or light scatter in the ultimately fabricated optical fiber. Accordingly, prior to drawing an optical fiber from preform 18, the surface thereof is polished. The surface is polished to achieve a desired optical quality that eliminates surface imperfections caused by the encasement removal process. It is preferred for the polishing step to achieve an optical quality of $\lambda/4$ where $\lambda$ is the wavelength of light that is to be transmitted by the ultimately fabricated optical fiber.

The resulting polished crystallite-free glass preform 20 is ready to be heated and drawn to produce a glass optical fiber 22. Since optical fiber 22 is to be drawn in a microgravity environment, there is no force of gravity available to aid the fiber drawing process as is well understood in the art of Earth-based fiber drawing techniques. Accordingly, the required draw force is greater than that would be used in a unit gravity environment. However, if the preform's viscosity is too high, the increased draw force will attenuate optical fiber 22 leading to failure. Thus, the increased draw force will necessitate a lower viscosity for the preform (i.e., higher draw temperature) than what would be used in a unit gravity environment.

The next processing step in the microgravity environment involves coating the drawn optical fiber 22 in a protective (e.g., polymer) coating to yield a coated optical fiber 24. Briefly and as is known in the art, drawn optical fiber 22 is coated with a polymer that is then cured using ultraviolet (UV) radiation. Finally, coated optical fiber 24 is stored (e.g., spooled) for transport back to the unit gravity environment.

Figure 2:
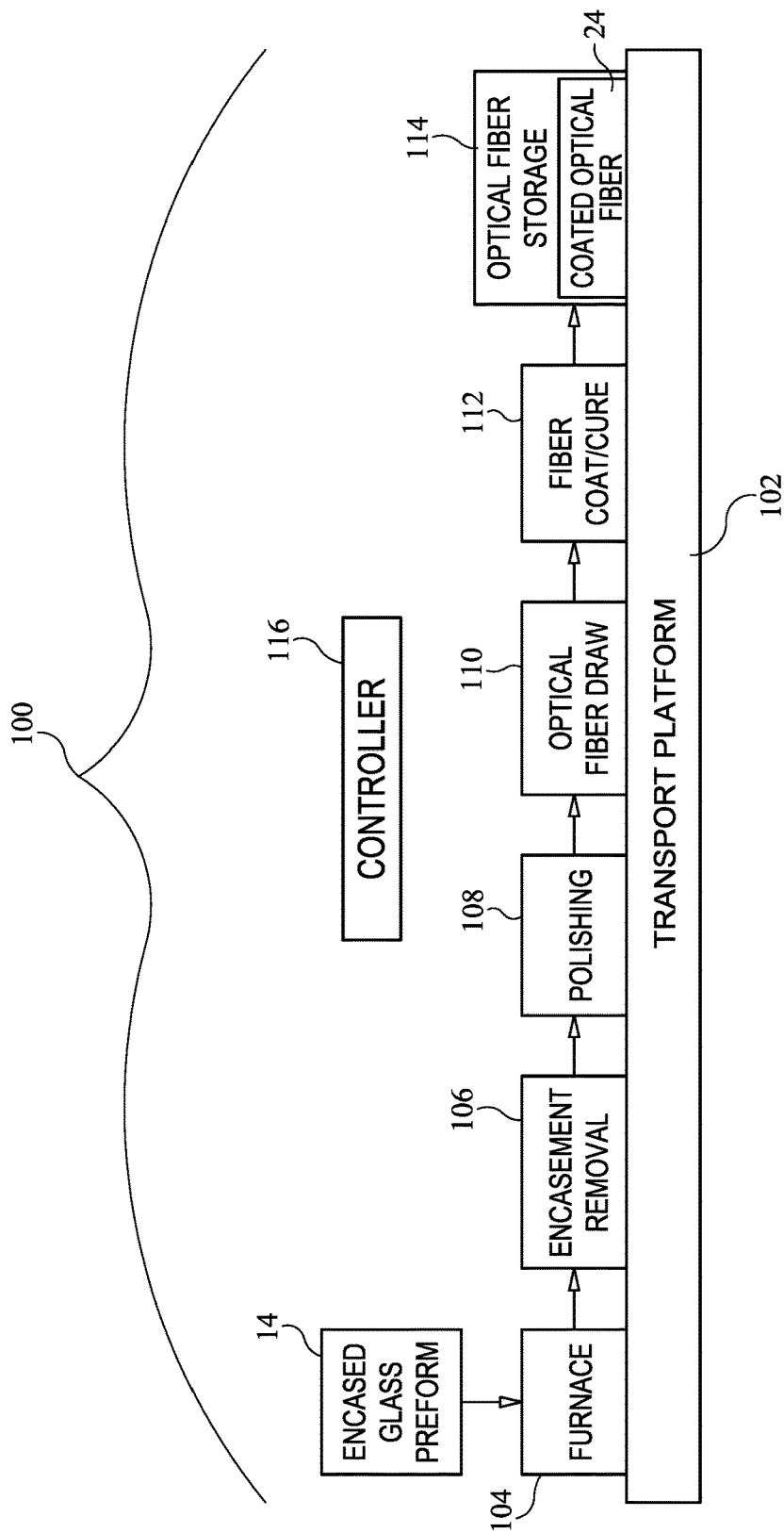
FIG. 2 is a schematic view of a reusable system for producing optical fibers in a microgravity environment in accordance with an embodiment of the present invention.

Referring now to FIG. 2, a system for carrying out the above-described method is shown and is referenced generally by numeral 100. In general, system 100 is a reusable facility that can be transported between an Earth-based, unit gravity environment and a microgravity (space) environment. When traveling to the microgravity environment, the cargo on board system 100 includes encased glass preform 14. When traveling from the microgravity environment the cargo onboard system 100 includes coated optical fiber 24.

System 100 includes a transport platform 102 to support the various operational elements of system 100. Platform 102 can be configured for rocket-launching into space, orbiting in space, returning to Earth from space. The operational elements onboard system 100 include a furnace 104 in which the encased glass preform is heated and cooled. System 100 also includes an encasement removal station 106 and a polishing station 108 where the encasing material is removed and the solidified crystallite-free glass preform is polished. These two elements could be combined into a single operational element where functions are carried out in an inert gas environment (e.g., argon, nitrogen, etc.). An optical fiber drawing station 110, a fiber coat and cure station 112, and an optical fiber storage station 114 produce coated optical fiber 24 from preform 20 as described above. A controller 116 can be provided to provide autonomous control of one or more of the operational elements.

The advantages of the present invention are numerous. Crystal-free non-oxide-glass optical fibers can be produced in long lengths to support a wide range of applications. The method lends itself to being carried out autonomously onboard or reusable platform launched into a space orbit for optical fiber production.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method for fabricating a glass optical fiber, comprising the steps of:
   providing a glass preform having a crystal melting temperature;
   encasing, in a unit gravity environment, the glass preform in a material to generate an encased glass preform, wherein the material remains solid at the crystal melting temperature and is inert with respect to the glass preform;
   placing the encased glass preform in a microgravity environment;
   heating the encased glass preform in the microgravity environment to a temperature above the crystal melting temperature until the glass preform melts and is free of crystals, wherein a crystallite-free glass preform is encased within the material;
   cooling the crystallite-free glass preform in the microgravity environment to generate a solid crystallite-free glass preform encased within the material;
   removing the material encasing the solid crystallite-free glass preform in the microgravity environment;
   polishing the solid crystallite-free glass preform in the microgravity environment; and
   drawing a glass optical fiber from the solid crystallite-free glass preform in the microgravity environment after said step of polishing.

2. A method according to claim 1, wherein the glass preform comprises a non-oxide glass.

3. A method according to claim 1, wherein the glass preform comprises a glass selected from the group consisting of heavy metal fluoride glasses and chalcogenide glasses.

4. A method according to claim 1, wherein the unit gravity environment comprises an Earth-based location.

5. A method according to claim 1, wherein the microgravity environment comprises a space-based location.

6. A method according to claim 1, wherein the material is selected from the group consisting of platinum, gold, and alloys of platinum and gold having a thickness in the range of 100 nanometers to 5 microns.

7. A method according to claim 1, wherein said step of removing comprises a mechanical process.

8. A method according to claim 1, wherein said step of removing comprises a chemical process.

9. A method according to claim 1, further comprising the step of coating the glass optical fiber with a polymer in the microgravity environment.

10. A method according to claim 1, wherein said step of placing comprises the step of transporting the encased glass preform from the unit gravity environment to the microgravity environment using a rocket.

11. A method for fabricating a glass optical fiber, comprising the steps of:
provividing a preform of a non-oxide glass having a crystal melting temperature;
encasing, in a unit gravity environment, the preform in a material to generate an encased preform, wherein the material remains solid at the crystal melting temperature and is inert with respect to the non-oxide glass;
placing the encased preform in a microgravity environment;
heating the encased preform in the microgravity environment to a temperature above the crystal melting temperature until the non-oxide glass melts and is free of crystals, wherein a crystallite-free preform is encased within the material;
cooling the crystallite-free preform in the microgravity environment to generate a solid crystallite-free preform encased within the material;
removing the material encasing the solid crystallite-free preform in the microgravity environment;
polishing the solid crystallite-free preform in the microgravity environment;
drawing a glass optical fiber from the solid crystallite-free preform in the microgravity environment after said step of polishing; and
coating the glass optical fiber with a polymer in the microgravity environment.

12. A method according to claim 11, wherein the non-oxide glass is selected from the group consisting of heavy metal fluoride glasses and chalcogenide glasses.

13. A method according to claim 11, wherein the unit gravity environment comprises an Earth-based location.

14. A method according to claim 11, wherein the microgravity environment comprises a space-based location.

15. A method according to claim 11, wherein the material is selected from the group consisting of platinum, gold, and alloys of platinum and gold having a thickness in the range of 100 nanometers to 5 microns.

16. A method according to claim 11, wherein said step of removing comprises a mechanical process.

17. A method according to claim 11, wherein said step of removing comprises a chemical process.

18. A method according to claim 11, wherein said step of placing comprises the step of transporting the encased preform from the unit gravity environment to the microgravity environment using a rocket.

19. A method for fabricating a glass optical fiber, comprising the steps of:
transporting an encased glass preform from a unit gravity environment to a microgravity environment, the encased glass preform including a material encasing a glass preform having a crystal melting temperature, wherein the material remains solid at the crystal melting temperature and is inert with respect to the glass preform;
heating the encased glass preform in the microgravity environment to a temperature above the crystal melting temperature until the glass preform melts and is free of crystals, wherein a crystallite-free glass preform is encased within the material;
cooling the crystallite-free glass preform in the microgravity environment to generate a solid crystallite-free glass preform encased within the material;
removing the material encasing the solid crystallite-free glass preform in the microgravity environment;
polishing the solid crystallite-free glass preform in the microgravity environment;
drawing a glass optical fiber from the solid crystallite-free glass preform in the microgravity environment; and
coating the glass optical fiber with a polymer in the microgravity environment.

20. A method according to claim 19, wherein the glass preform comprises a non-oxide glass selected from the group consisting of heavy metal fluoride glasses and chalcogenide glasses.

21. A method according to claim 19, wherein the unit gravity environment comprises an Earth-based location, wherein the microgravity environment comprises a space-based location, and wherein a transport platform carries out said step of transporting the encased glass preform from the unit gravity environment to the microgravity environment, said method further comprising the step of transporting the glass optical fiber coated in the polymer to the unit gravity environment, wherein said steps of heating, cooling, removing, polishing, drawing, and coating are carried out on the transport platform.

22. A method according to claim 19, wherein the material is selected from the group consisting of platinum, gold, and alloys of platinum and gold having a thickness in the range of 100 nanometers to 5 microns.

23. A method according to claim 19, wherein said step of removing comprises a mechanical process.

24. A method according to claim 19, wherein said step of removing comprises a chemical process.

* * * * *